(12) United States Patent
Sakurai et al.

(10) Patent No.: US 11,200,764 B2
(45) Date of Patent: Dec. 14, 2021

(54) AUTHORIZATION TO UNLOCK A SPACE

(71) Applicant: FUJIFILM Business Innovation Corp., Tokyo (JP)

(72) Inventors: Kimiko Sakurai, Kanagawa (JP); Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/776,504

(22) Filed: Jan. 30, 2020

(65) Prior Publication Data

US 2021/0019969 A1    Jan. 21, 2021

(30) Foreign Application Priority Data

Jul. 17, 2019    (JP) .............................. JP2019-132299

(51) Int. Cl.
*G07C 9/00*    (2020.01)

(52) U.S. Cl.
CPC .................... *G07C 9/00817* (2013.01); *G07C 2009/00841* (2013.01)

(58) Field of Classification Search
None
See application file for complete search history.

(56) References Cited

U.S. PATENT DOCUMENTS 10,735,216 B2 *   8/2020   Fadell .................. G08B 27/003
2019/0311303 A1 * 10/2019   Kanteti ..................... G07C 9/22

FOREIGN PATENT DOCUMENTS

JP    2018145601    9/2018
WO   2018158973    9/2018

* cited by examiner

*Primary Examiner* — Adolf Dsouza
(74) *Attorney, Agent, or Firm* — JCIPRNET

(57) ABSTRACT

An information processing system includes a receiving unit that receives request to reserve a lockable place for a time window from a first person; and an authority giving unit that gives one or more second persons an unlocking authority to unlock the place within the time window.

16 Claims, 14 Drawing Sheets

AUTHORIZATION TO UNLOCK A SPACE

CROSS-REFERENCE TO RELATED APPLICATIONS

This application is based on and claims priority under 35 USC 119 from Japanese Patent Application No. 2019-132299 filed Jul. 17, 2019.

BACKGROUND

(i) Technical Field

The present disclosure relates to an information processing system, an information processing apparatus, and a non-transitory computer readable medium.

(ii) Related Art

Japanese Unexamined Patent Application Publication No. 2018-145601 discloses transmitting an issuance request requesting issuance of an unlocking authority from a management server that is an issuer on the basis of acquired issuer information, receiving the unlocking authority, and transmitting an unlocking instruction to unlock a smart lock based on the unlocking authority to the smart lock.

SUMMARY

If a user can reserve a place which the user will use, user's convenience improves.

Furthermore, if a person different from a person who makes a reservation of a place can use this place, user's convenience further improves. However, if this place is a place with a lock, it is difficult for a person different from the person who makes the reservation to use this place.

Aspects of non-limiting embodiments of the present disclosure relate to enabling a person different from a person who reserves a place to use the place.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including: a receiving unit that receives request to reserve a lockable place for a time window from a first person; and an authority giving unit that gives one or more second persons an unlocking authority to unlock the place within the time window.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure is described below with reference to the drawings.

Figure 1:
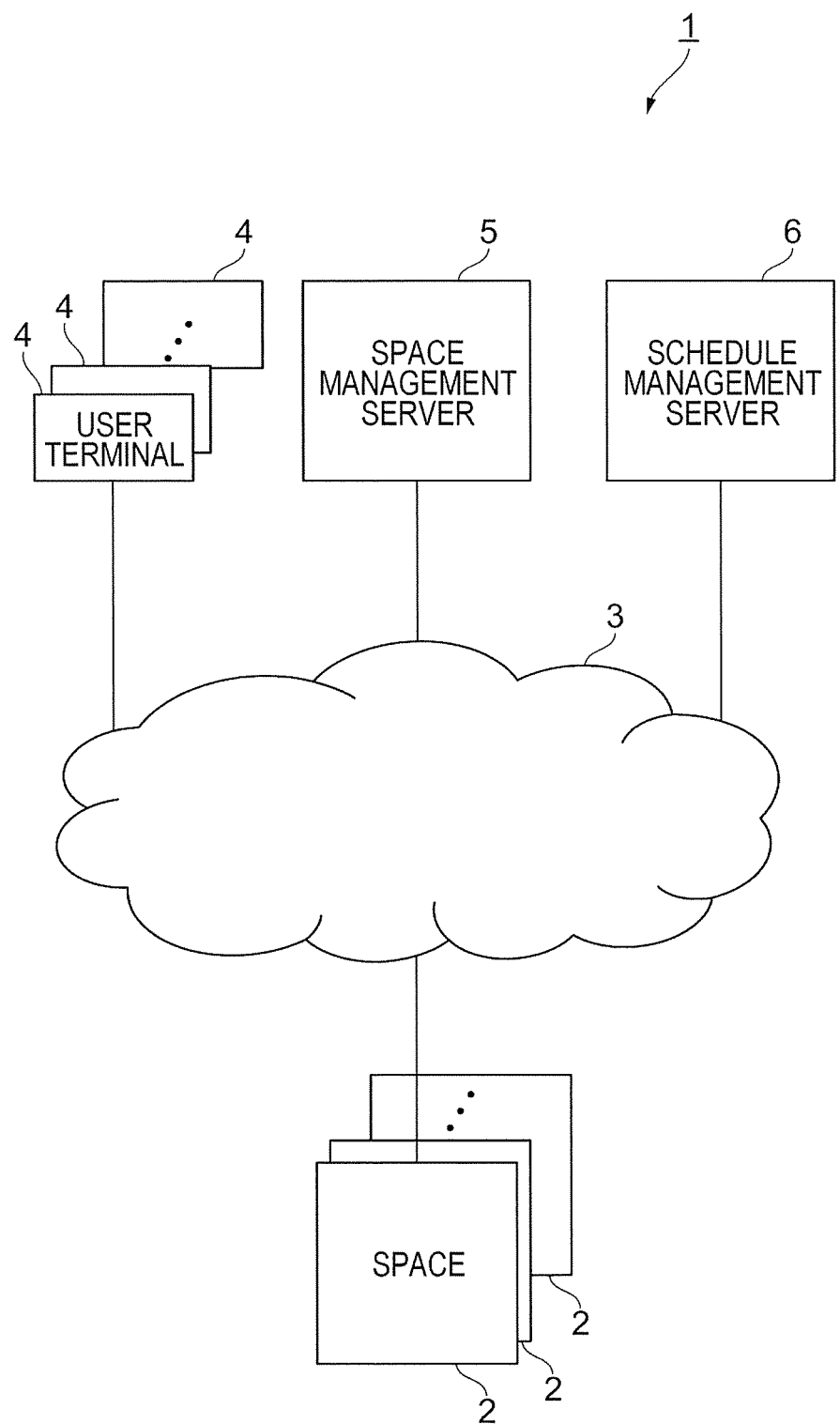
FIG. 1 schematically illustrates an example of an overall configuration of an information processing system.

FIG. 1 schematically illustrates an example of an overall configuration of an information processing system 1 according to the present exemplary embodiment.

In the present exemplary embodiment, plural spaces 2, each of which is an example of a place reserved and used by a user, are provided.

Examples of the spaces 2 include booths, guest rooms of a facility such as an accommodation facility, and conference rooms of a company. These are examples of the spaces 2 that are partitioned from surroundings by a wall, a partition, or the like. Furthermore, examples of the spaces 2 according to the present exemplary embodiment include tables and seats on which service is offered at a restaurant, a barber shop, or the like. These are examples of the spaces 2 opened to surroundings.

Furthermore, the spaces 2 according to the present exemplary embodiment are given names, numbers, or the like for management. There may be a charge for a reservation of a space 2 or there may be no charge for a reservation of a space 2.

The information processing system 1 illustrated in FIG. 1 includes various terminals connected to a cloud network 3.

In FIG. 1, user terminals 4 operated by users, a space management server 5 that manages the spaces 2, and a schedule management server 6 that manages a schedule of a user who makes a reservation are illustrated as examples of the terminals connected to the cloud network 3.

In FIG. 1, a single server is prepared for each purpose or function. That is, a single space management server 5 and a single schedule management server 6 are prepared for each purpose or function.

Note, however, that plural servers may be prepared for each purpose or function or a single server may be in charge of plural purposes or functions.

The spaces 2 may be managed by a single business operator or plural business operators. For example, different business operators may be in charge of management of reservations, management of entry into and exit from rooms, statuses of usage of rooms, and the like, management of charging of usage fees on users, and management of members registered as users.

As described above, the spaces 2 managed as targets reserved by users need not be spaces of the same type. For example, some of the spaces 2 may be booths, and some of the spaces 2 may be seats or tables of a restaurant or the like.

Furthermore, management of a single purpose or function may be provided by plural business operators in cooperation.

In the present exemplary embodiment, doors of the spaces 2 are equipped with an electronic lock so that the spaces 2 can be locked. In the present exemplary embodiment, persons who have an authority to unlock the spaces 2 can access the spaces 2.

To unlock a space 2, a person who tries to unlock the space 2 gives an unlocking instruction by operating his or her user terminal 4. This instruction is sent to the space management server 5, and the space management server 5 receives the instruction. Then, the space management server 5 gives an instruction to unlock the space 2 for which the unlocking instruction is aimed. This causes the electronic lock of the space 2 to operate, thereby unlocking the space 2.

Although an example in which an unlocking instruction is transmitted to a space 2 through the space management server 5 has been described in the present exemplary embodiment, how an unlocking instruction is transmitted to a space 2 is not limited to this.

For example, an unlocking instruction may be directly transmitted from a user terminal 4 to a space 2 by using wireless communication such as near field communication or Bluetooth (Registered Trademark).

In the present exemplary embodiment, it is assumed that the user terminals 4 are smartphones, which are portable. Note, however, that the portable user terminals 4 may be wearable terminals, notebook computers, or gaming terminals.

The space management server 5 manages various kinds of information related to the spaces 2. For example, the space management server 5 manages information for specifying users, information for specifying the spaces 2 reserved by users, start dates and times of reservations, and end dates and times of reservations.

Examples of the information for specifying users include users' names, genders, ages, accounts, passwords, and information for management given to the individuals. Examples of the information for specifying the spaces 2 used by users include information for specifying places such as addresses or locations and names and numbers for management.

The space management server 5 may manage reservations of articles and services associated with the spaces 2. For example, the space management server 5 may manage articles and services that are permitted to be borrowed or used and consumed or consumable articles and services.

Furthermore, the space management server 5 manages various kinds of information related to usage of the spaces 2. For example, the space management server 5 manages information on statuses of usage of the spaces 2 and information on users of the spaces 2.

Furthermore, the space management server 5 unlocks and locks the spaces 2. Furthermore, the space management server 5 gives an unlocking authority to unlock a space 2 to a user who uses the space 2 and cancels the given unlocking authority.

The schedule management server 6 is a terminal that executes an application, groupware, or the like used for management of a schedule by a user who makes a reservation. Note, however, that the schedule management server 6 is unnecessary in a case where a user manages his or her schedule on an application installed in his or her user terminal 4. The schedule management server 6 stores therein, for example, an account, a password, a title of a schedule, a place of a schedule, start date and time, end date and time, and the like of a user whose schedule is managed.

Appearance Configuration of Spaces 2

Figure 2:
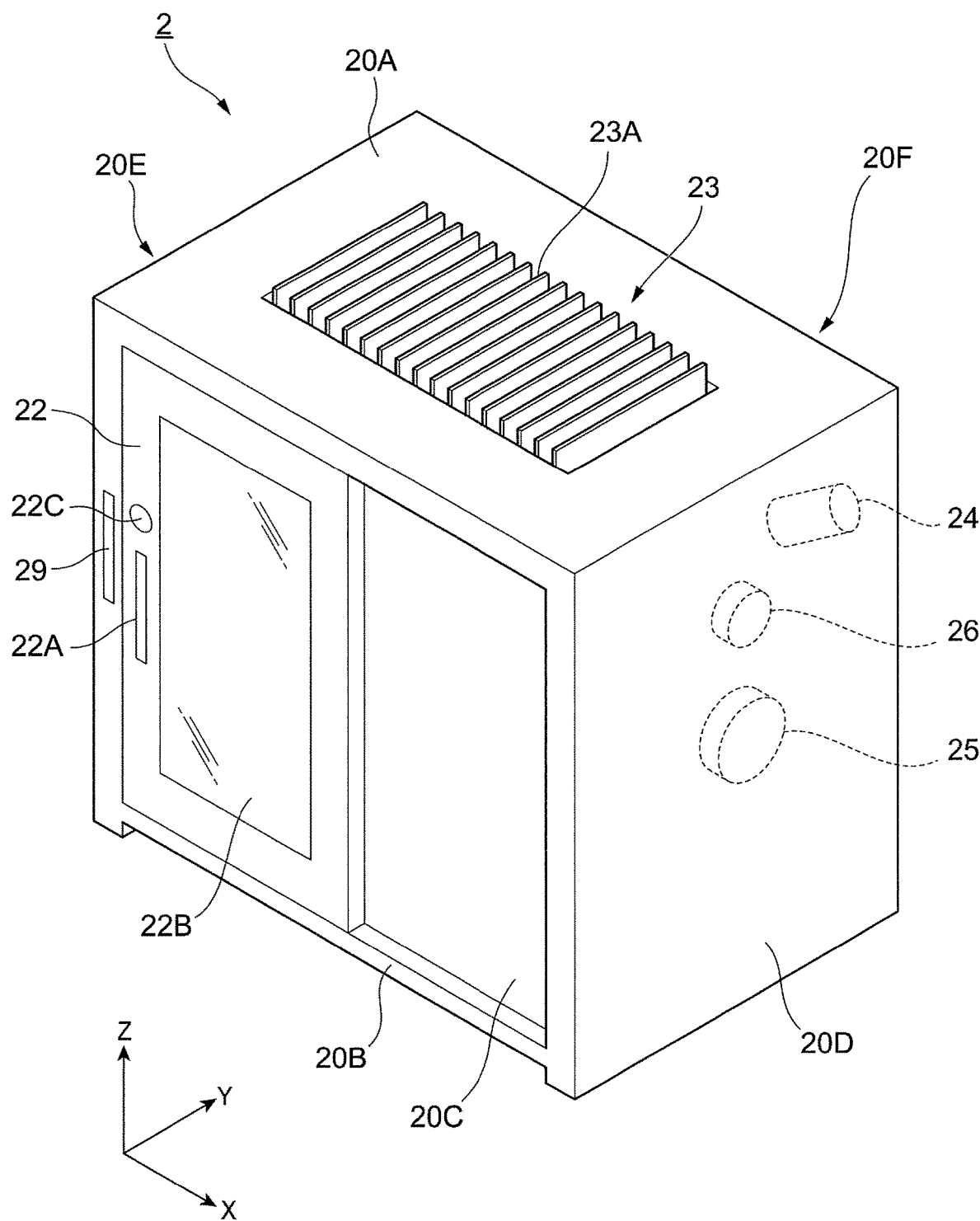
FIG. 2 is a view for explaining an example of a booth-type space.

FIG. 2 is a view for explaining an example of a booth-type space 2.

The booth-type space 2 illustrated in FIG. 2 is placed at an indoor or outdoor place such as a train station, an airport, an office building, a commercial facility such as a restaurant or a department store, a bank, a library, an art museum, a museum, a public institution or facility, an accessway, or a park.

The booth-type space 2 illustrated in FIG. 2 is a closed-type booth provided with a ceiling. Note that the closed type does not mean "completely closed" and just needs to have practical sound insulation.

That is, the space 2 may have an opening or a gap such as an air inlet or a small window in a part of a body of the space 2. The window may be openable and closable.

The body of the space 2 illustrated in FIG. 2 includes a ceiling 20A, a floor 20B, a wall 20C equipped with a door 22, which is openable and closable, two walls 20D and 20E located on both sides of the wall 20C, and a wall 20F that faces the door 22.

In FIG. 2, the ceiling 20A has a ventilating hole 23. The ventilating hole 23 is provided with a louver 23A that can adjust an opening area. In FIG. 2, the louver 23A is fully opened.

In the present exemplary embodiment, an inside of the body and an outside of the body are communicated through the ventilating hole 23, and a temperature in the inside of the body and a temperature in the outside of the body are substantially equal accordingly. In particular, in the present exemplary embodiment, no air-conditioning apparatus such as a heating apparatus or a cooling apparatus is provided in the body, and therefore the temperature in the inside of the body and the temperature in the outside of the body are substantially equal.

Note that an air-conditioning apparatus may be provided in the body so that the temperature in the inside of the body can be adjusted.

In the present exemplary embodiment, it is assumed that the door 22 is a sliding door that is movable along the wall 20C. Although the door 22 is a single sliding door that slides in one direction in FIG. 2, the door 22 may be a sliding doorset including two or more members sliding on respective lanes or a sliding doorset including two members sliding on a single lane.

Note, however, that the door 22 is not limited to a sliding door. For example, the door 22 may be a single swing door including a single member that swings so as to draw an arc or may be a double swing door that includes two members by which a single opening is closed.

Alternatively, the door 22 may be a folding door that is opened so that two members linked with hinges are folded. The folding door is further classified into a folding door opened to one side and a folding door opened to both sides.

Alternatively, the door 22 may be a special type such as a sliding door that is drawn into a wall or a partition door.

Note that the door 22 may be a door that is opened inward or a door that is opened outward.

In the present exemplary embodiment, the door 22 is provided with a handle 22A used by a user to open or close the door 22.

Furthermore, the door 22 has, on a central part thereof, a member 22B that has been processed in consideration of privacy and security. The member 22B may be a transparent plate having, on an inner side thereof, a metal plate (e.g., perforated metal) provided with a large number of holes, may be a transparent plate having, on an inner side thereof, blinding members disposed at certain intervals, may be a transparent plate coated with a film that allows a person looking squarely at the door 22 to easily see an inside but makes it hard for a person looking at an angle to the door 22 to see the inside, or may be a transparent plate that has been processed to lower visibility of the inside.

The transparent plate is, for example, made of glass or an acrylic resin. Properties of transparency of the film attached for privacy and security are decided on the basis of a relationship between a position of the door 22 and a user's working position. In a case where a user works at a position that is far from the door 22 and faces the door 22, it is only necessary to use a film that makes it hard for a person looking squarely at the door 22 to see the inside and allows a person looking at an angle to the door 22 to easily see the inside.

The film may be a liquid crystal film that can electrically switch between a transparent state and a milky state or a polarizing film that can electrically control transparency.

Examples of the processing for lowering visibility include forming tiny cuts on a surface of the member so that light is scattered on the surface.

The processing may be applied to a part of the member 22B. For examples, the member 22B may have a structure such that parts thereof that are close to the floor and the ceiling are transparent and a range thereof through which a person can peek at a monitor for work has been processed to have less visibility.

The member 22B makes it possible to check whether or not a user is present from an outside while hiding a screen of a monitor from the outside.

A member other than the door 22 may also be processed in consideration of privacy and security. For example, at least a part of the walls 20D, 20E, and 20F may be processed in consideration of privacy and security.

Furthermore, the door 22 is provided with an electronic lock 22C that can lock and unlock the door 22. The electronic lock 22C is not limited in particular and can be a known electronic lock.

The electronic lock 22C includes, for example, a drive source such as a motor and a moving part that is caused to move by the drive source. A part of the moving part is hooked onto a body side, and thereby opening of the door 22 is restricted.

The number of persons which the space 2 accommodates is roughly determined by a volume of the space 2. In the present exemplary embodiment, it is assumed that the space 2 is a cabin-type space that is basically used by a single person.

Note, however, that the space 2 may be a large room that accommodates a large number of persons. The large room may be a single independent room or may be a room created by connecting plural rooms 2 by removing one of or both of the walls 20D and 20E of the spaces 2.

Note that the cabin type does not mean that only one person can use the space and means that a small number of persons (e.g., two or three persons) can use the space.

A shape and a structure of the body, equipment, and performance of the space 2 are not limited in particular. For example, the ceiling 20A may be removed.

In the present exemplary embodiment, a single desk and a single chair (not illustrated) are placed in the body. Furthermore, supplied equipment and apparatuses, reserved equipment and apparatuses, and the like are placed on the desk.

Furthermore, an imaging device 24 that is, for example, a camera for imaging an inside of the body and a human sensor 25 that detects a user in the body are provided in the body. Furthermore, a temperature sensor 26 that detects a temperature in the space 2 is provided in the body.

Furthermore, an information acquisition device 29 for acquiring individual information of a user of the space 2 may be provided on an outer surface of the body.

The information acquisition device 29 is, for example, a reader that reads an ID card held by a user.

Alternatively, the information acquisition device 29 may be a reader that reads a fingerprint, a pattern of veins, and the like of a user.

Configuration of Terminal

Figure 3:
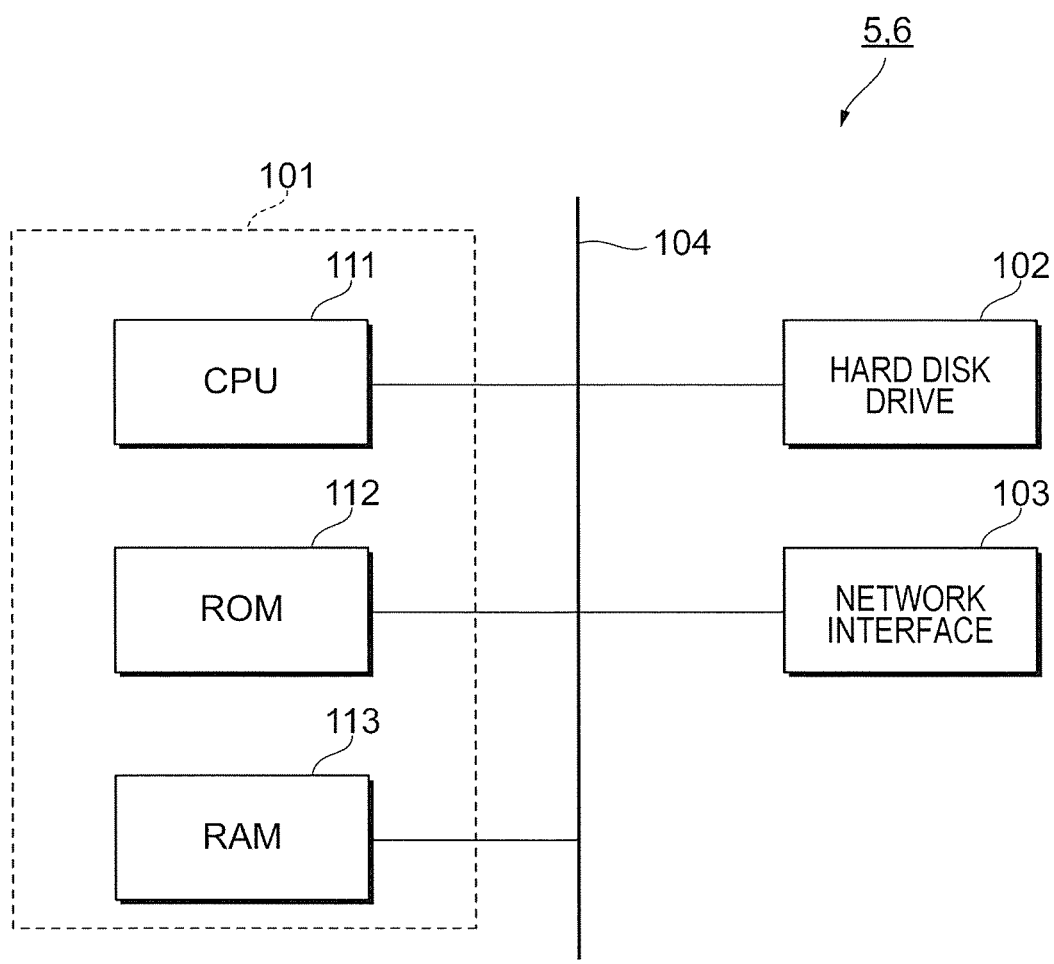
FIG. 3 is a view for explaining an example of a hardware configuration of a management server used in an exemplary embodiment.

FIG. 3 is a view for explaining an example of a hardware configuration of a management server used in the exemplary embodiment. The management server according to the present exemplary embodiment is the space management server 5 (see FIG. 1) or the schedule management server 6 (see FIG. 1).

The management server has a control unit 101 that controls operation of the whole server, a hard disk drive 102 in which data such as management data is stored, and a network interface 103 that achieves communication through a local area network (LAN) cable or the like.

The control unit 101 has a central processing unit (CPU) 111, a read only memory (ROM) 112 in which basic software, a basic input output system (BIOS), and the like are stored, and a random access memory (RAM) 113 used as a work area. The CPU 111 may be a multi-core CPU. The ROM 112 may be a rewritable non-volatile semiconductor memory. The control unit 101 is a computer.

The hard disk drive 102 is a device that writes and reads data into and from a non-volatile storage medium having a disc-shaped substrate coated with a magnetic substance. Note, however, that the non-volatile storage medium may be a semiconductor memory or a magnetic tape.

In addition, the management server includes an input device such as a keyboard or a mouse and a display device such as a liquid crystal display device as needed.

The control unit 101, the hard disk drive 102, and the network interface 103 are connected through a bus 104 or a signal line (not illustrated).

Figure 4:
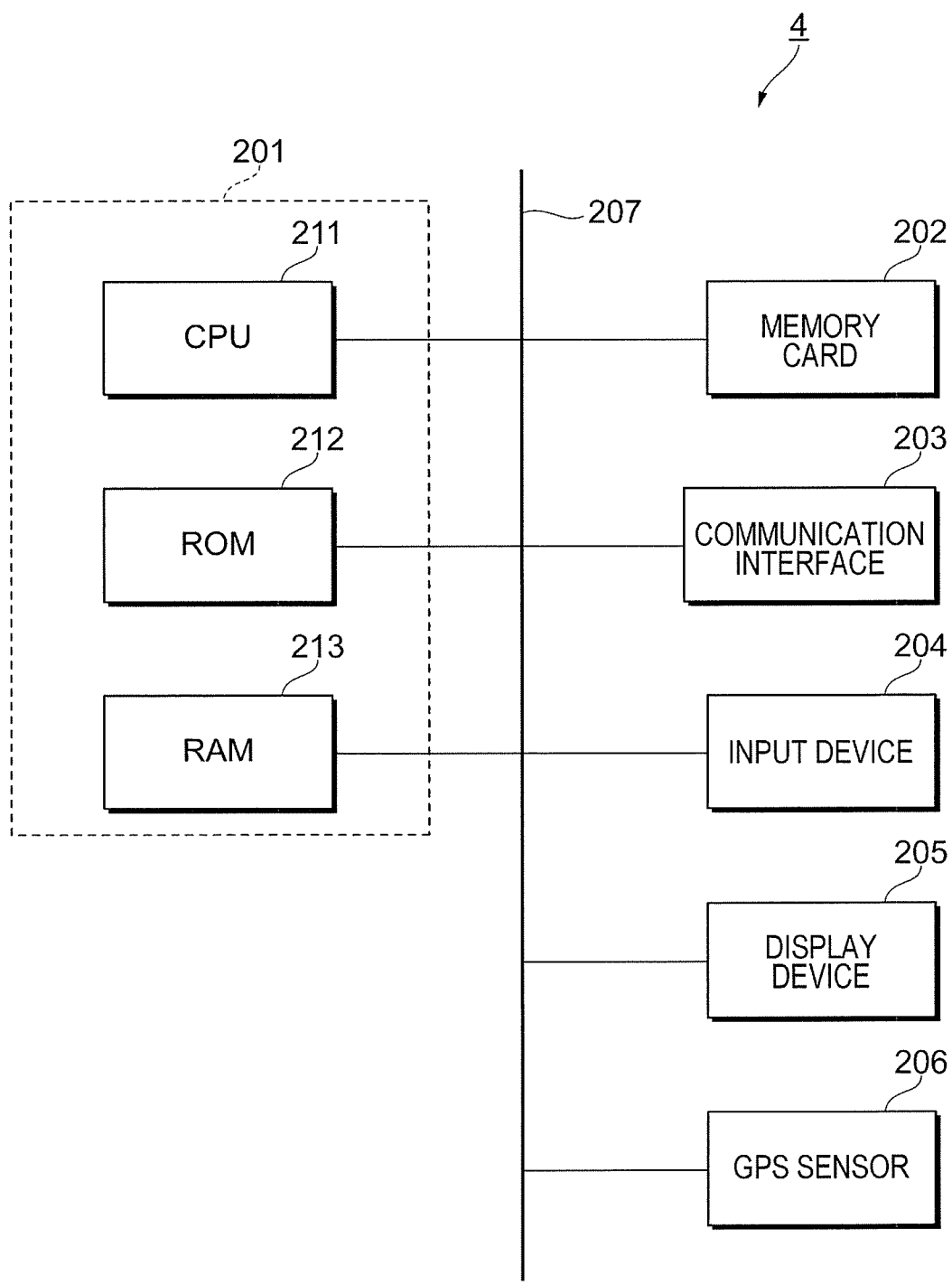
FIG. 4 is a diagram illustrating an example of a hardware configuration of a user terminal.

FIG. 4 is a diagram illustrating an example of a hardware configuration of the user terminal 4. FIG. 4 illustrates a case where the user terminal 4 is a smartphone.

The user terminal 4 has a control unit 201 that controls operation of the whole device, a memory card 202 in which various kinds of data are stored, various communication interfaces 203 that are compliant with a wireless communication standard, an input device 204 such as a touch sensor, a display device 205 such as a liquid crystal display device or an electro luminescence display device, and a global positioning system (GPS) sensor 206.

The control unit 201 has a CPU 211, a ROM 212 in which firmware, BIOS, and the like are stored, and a RAM 213 used as a work area. The CPU 211 may be a multi-core CPU. The ROM 212 may be a rewritable non-volatile semiconductor memory.

The communication interfaces 203 are, for example, an interface used for connection with a mobile communication system and an interface used for connection with a wireless LAN.

The GPS sensor 206 is a sensor that measures a position of the user terminal 4 on the basis of a radio wave received from a GPS satellite. Information on latitude, longitude, and altitude supplied from the GPS sensor 206 gives a current position of the user terminal 4. Note that the GPS sensor 206 may support an indoor position measurement system.

Figure 5:
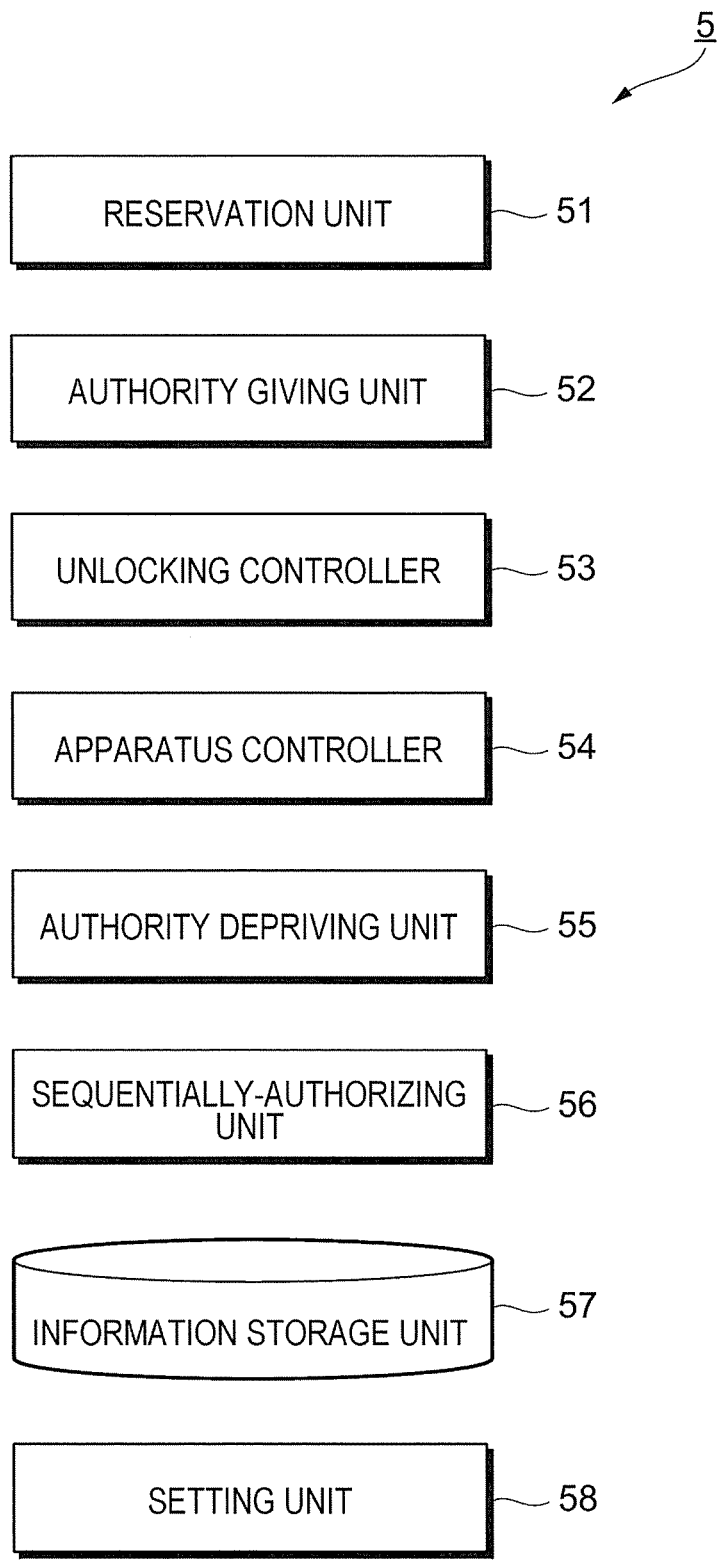
FIG. 5 is a view for explaining an example of a functional configuration of a space management server.

FIG. 5 is a view for explaining an example of a functional configuration of the space management server 5 (see FIG. 1). FIG. 5 illustrates a functional configuration concerning unlocking and locking of a space 2.

The space management server 5 includes a reservation unit 51, an authority giving unit 52, an unlocking controller 53, an apparatus controller 54, an authority depriving unit 55, a sequentially-authorizing unit 56, an information storage unit 57, and a setting unit 58.

The reservation unit 51, the authority giving unit 52, the unlocking controller 53, the apparatus controller 54, the authority depriving unit 55, the sequentially-authorizing unit 56, and the setting unit 58 are realized, for example, by execution of a program by the control unit 101 (see FIG. 3). The information storage unit 57 is, for example, realized by the hard disk drive 102.

Although a case where these functional units are provided in the space management server 5, which is an example of an information processing apparatus, has been described in the present exemplary embodiment, plural information processing apparatuses may be prepared and these functional units may be separately provided in these information processing apparatuses. In this case, an information processing system is constituted by these information processing apparatuses, and the functional units are realized by this information processing system.

The reservation unit 51, which is an example of a receiving unit, receives a request to reserve a space 2, which is an example of a place, from a person (hereinafter, a person who requests to reserve a space 2 is referred to as a "first person").

The authority giving unit 52, which is an example of an authority giving unit, gives a second person an unlocking authority to unlock the space 2 within a time window of the reservation made by the first person.

The unlocking controller 53 unlocks and locks each of the spaces 2 by sending a control signal to the space 2.

The apparatus controller 54, which is an example of a controller, controls an apparatus placed in each of the spaces 2 by sending a control signal to the apparatus.

The authority depriving unit 55, which is an example of a depriving unit, deprives the first person or the second person of an unlocking authority.

The sequentially-authorizing unit 56, which is an example of a sequentially-authorizing unit, gives an unlocking authority to unlock a place reserved by the first person to a person different from a person who unlocked the place every time the place is unlocked within a time window of the reservation of the place.

The information storage unit 57 holds therein information on unlocking and locking of the spaces 2.

The setting unit 58, which is an example of a setting unit, sets a person to which an unlocking authority is to be given by the sequentially-authorizing unit 56.

Figure 6:
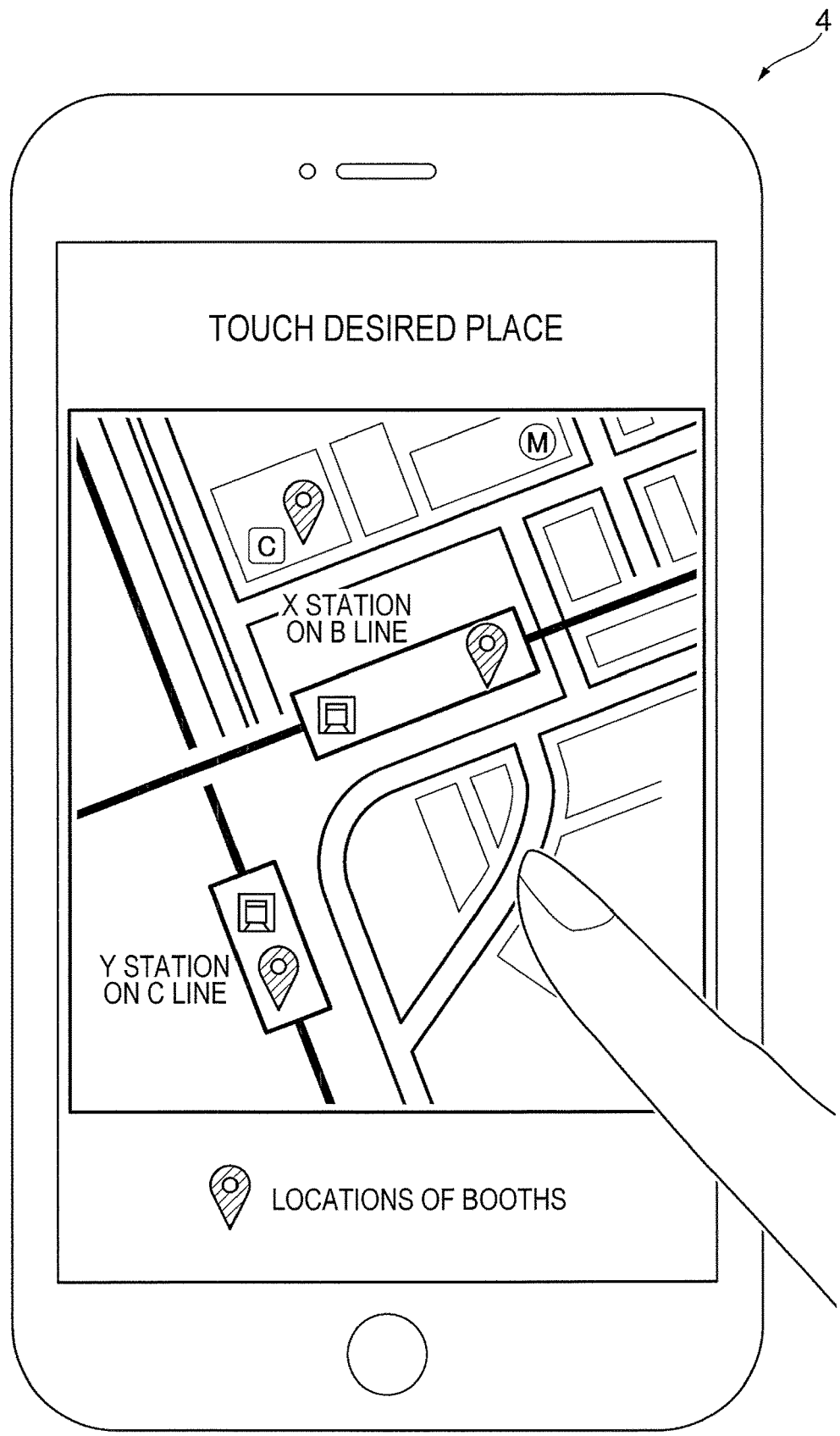
FIG. 6 illustrates an example of a display screen displayed on a user terminal of a person who reserves a space.

FIG. 6 illustrates an example of a display screen displayed on the user terminal 4 of a first person when the first person tries to reserve the space 2.

On the display screen illustrated in FIG. 6, a map is displayed, and plural locations of the spaces 2 are displayed on the map.

In the present exemplary embodiment, when a first person wants to reserve a space 2, the first person first selects a location from among the plural locations of the spaces 2 on the map.

Note that the way in which the plural locations of the spaces 2 are displayed is not limited to this. For example, the plural locations of the spaces 2 may be displayed in a list form, and the first person may select a location from the list.

Figure 7:
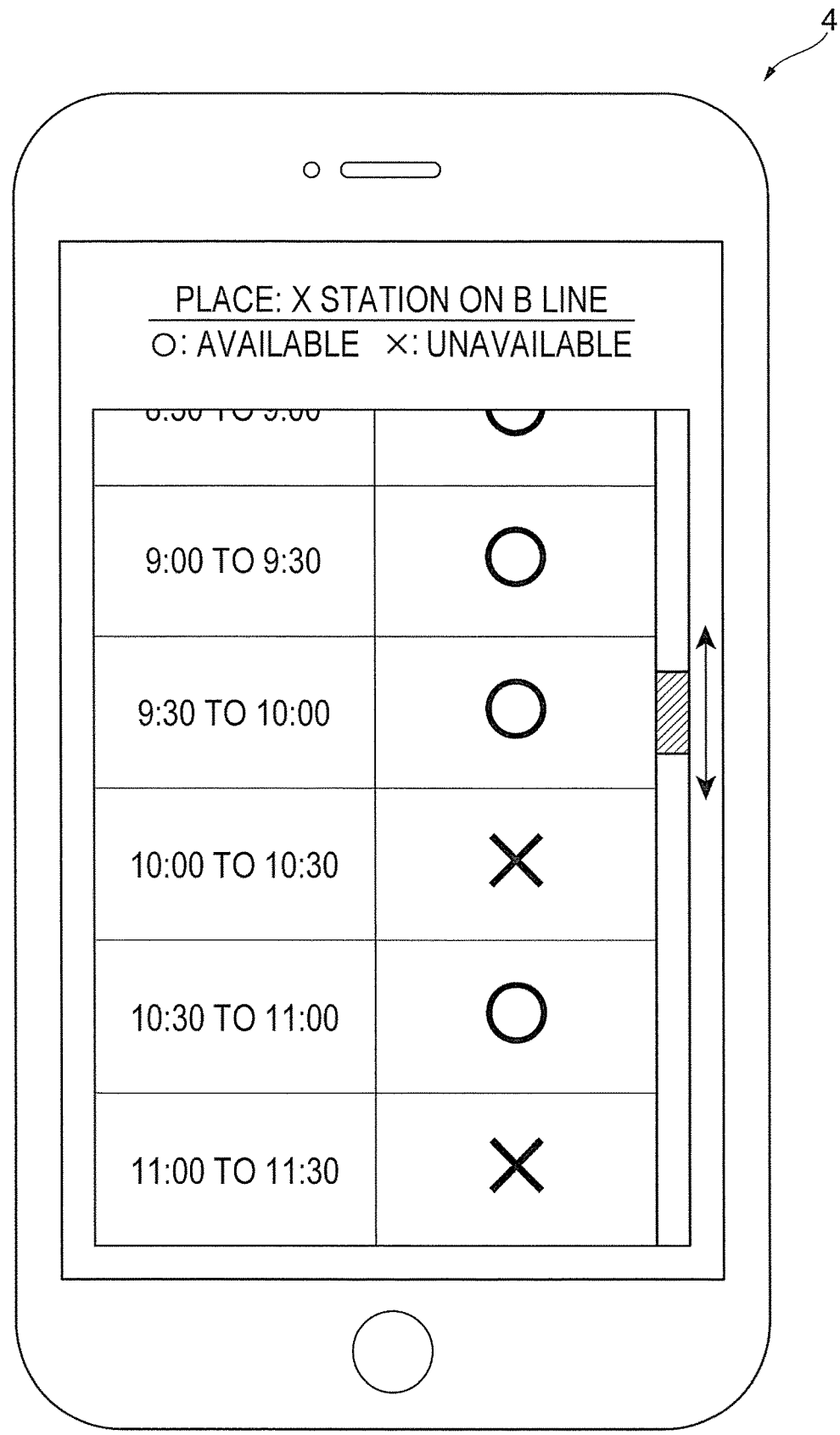
FIG. 7 illustrates another example of a display screen displayed on the user terminal.

When the first person selects a location, availability of the space 2 at the selected location is displayed as illustrated in FIG. 7, which illustrates another example of a display screen displayed on the user terminal 4. In FIG. 7, time windows for which the space 2 has already been reserved and time windows for which the space 2 is still available are distinguishable.

The first person designates a time window for which the first person wants to reserve the space 2 on the display screen. Then, the first person presses "Reserve" button (not illustrated). The length, start time, and end time of the time window may be freely set by the first person.

This causes the space management server 5 to reserve the space 2 for the time window.

More specifically, the reservation unit 51 of the space management server 5 receives information on the location of the space 2 and the time window and registers the information on the location of the space 2 and the time window in the information storage unit 57.

Then, a confirmation of the reservation is sent to the user terminal 4, and thus the first person is informed that the reservation has been confirmed.

Figure 8:
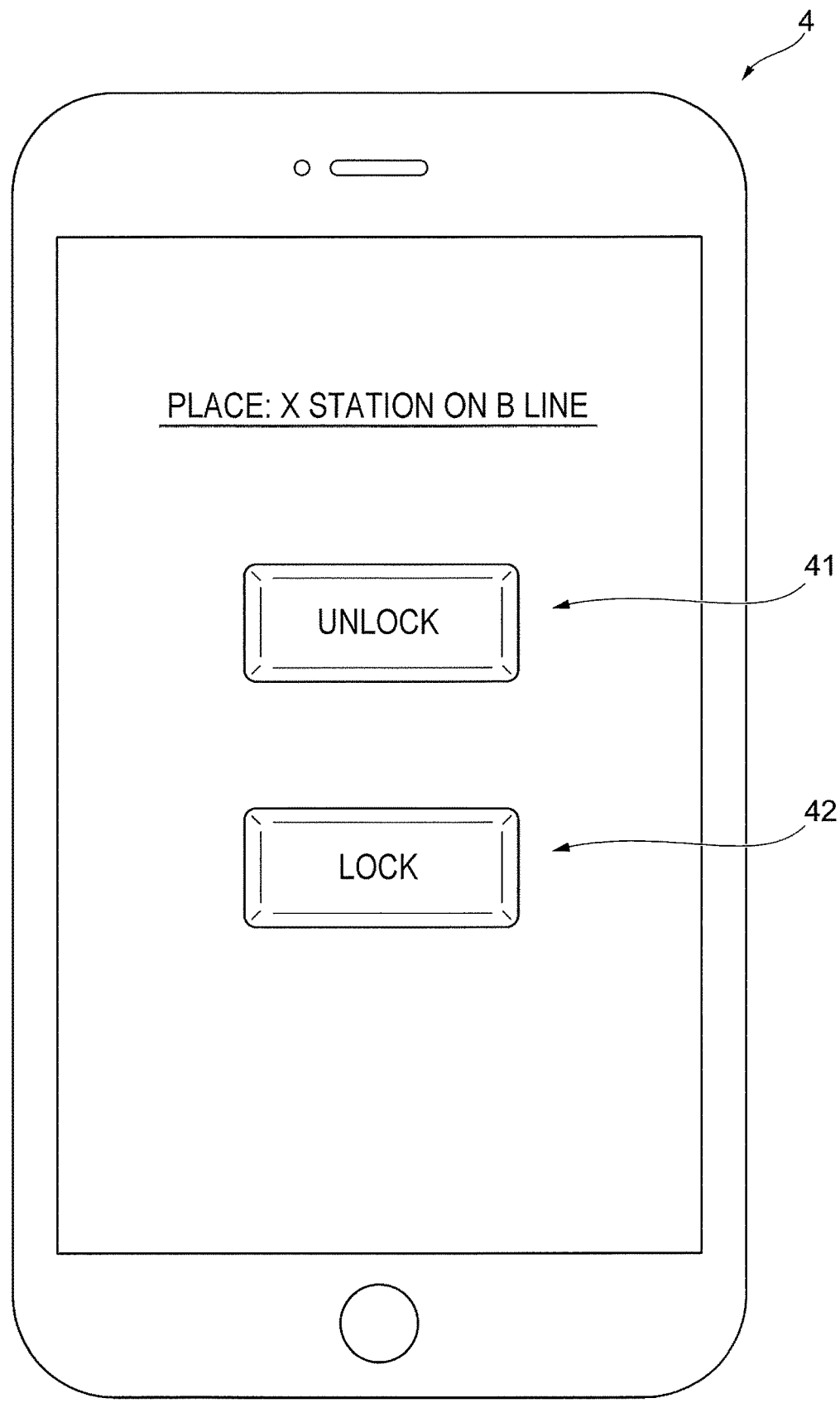
FIG. 8 illustrates another example of the display screen displayed on the user terminal of the person who reserves a space.

FIG. 8 illustrates another example of a display screen displayed on the user terminal 4 of the first person.

In the present exemplary embodiment, when the first person tries to unlock the space 2 which the first person reserved, for example, a screen illustrated in FIG. 8 is displayed on the user terminal 4.

In the present exemplary embodiment, an unlocking authority to unlock the space 2 is given to the first person, and an unlocking button 41 for unlocking the space 2 is displayed on the user terminal 4 as illustrated in FIG. 8.

The space 2 is unlocked when the first person selects the unlocking button 41 within the time window of the reservation of the space 2.

In particular, in the present exemplary embodiment, when the time window of the reservation of the space 2 starts, the unlocking authority given to the first person becomes effective, thereby enabling the first person to unlock the space 2. When the first person selects the unlocking button 41, the space 2 is unlocked.

The first person is also given a locking authority. When the first person selects a locking button 42 displayed on the user terminal 4 within the time window, the space 2 is locked.

Furthermore, in the present exemplary embodiment, when the time window ends, the unlocking authority and the locking authority given to the first person become ineffective, and the unlocking button 41 and the locking button 42 displayed on the user terminal 4 disappear.

Furthermore, in the present exemplary embodiment, an unlocking authority can be given to a person (hereinafter referred to as a "second person") different from the first person.

Figure 9:
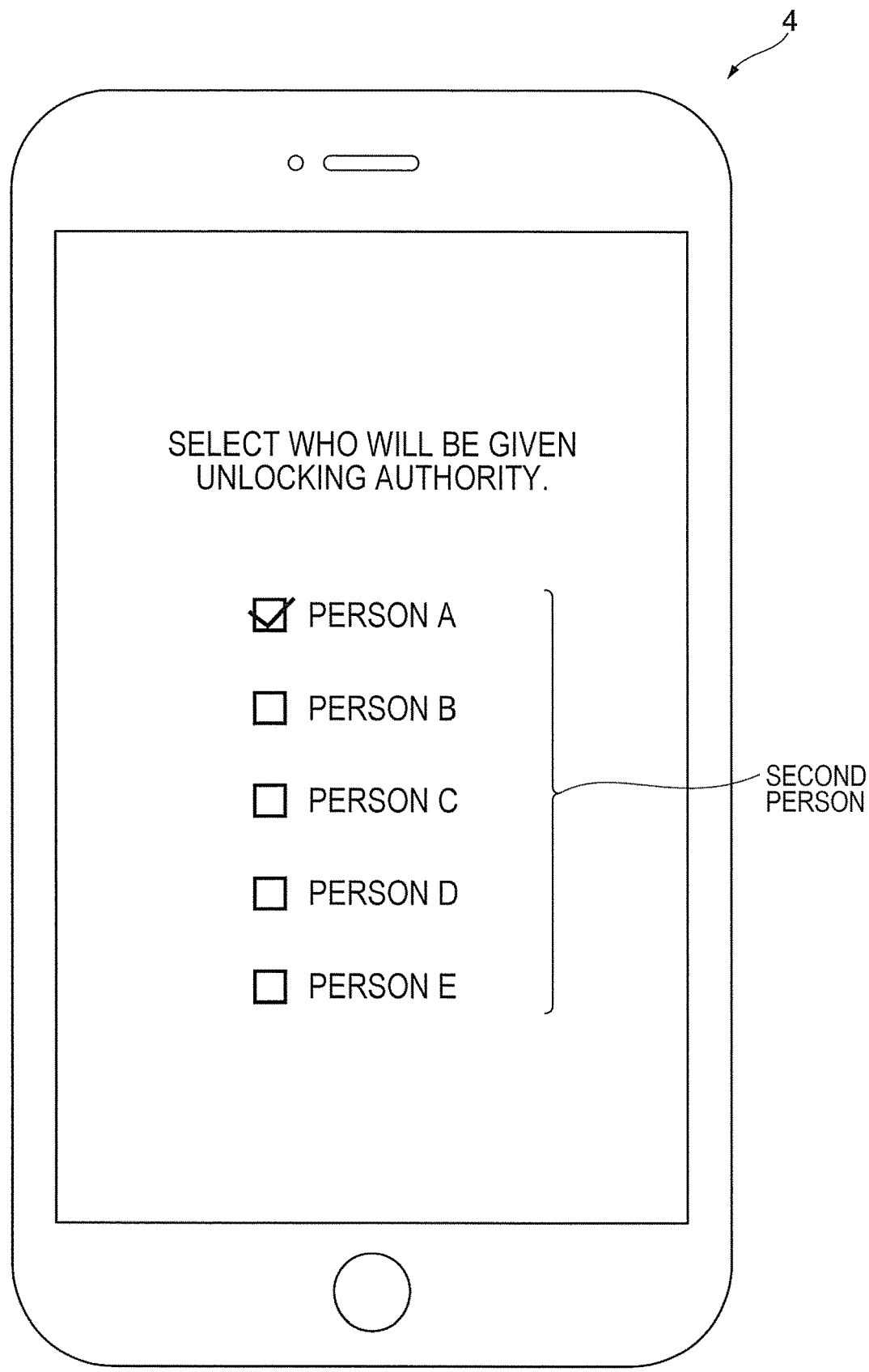
FIG. 9 illustrates another display example on the user terminal.

Specifically, in the present exemplary embodiment, when the first person performs a predetermined operation on his or her user terminal 4, for example, a list of second persons is displayed on the user terminal 4 as illustrated in FIG. 9, which illustrates another display example of the user terminal 4.

To give an unlocking authority to a second person, for example, the first person selects a second person to be given an unlocking authority from the list of second persons by operating the user terminal 4.

In the present exemplary embodiment, persons who use the spaces 2 register themselves as users in advance, and the second persons displayed on the user terminal 4 of the first person are persons who have registered themselves as users in advance. In particular, in the present exemplary embodiment, persons who have registered themselves as users in advance are candidates for the second persons.

In the present exemplary embodiment, second persons who have registered themselves as users and have, for example, a specific relationship with the first person are displayed as candidates on the user terminal 4 of the first person.

More specifically, for example, second persons who belong to the same organization as the first person are displayed as candidates. In the present exemplary embodiment, the first person selects a second person from among these candidates.

Alternatively, for example, the first person may register plural candidates for a second person in advance and select a second person from among these registered candidates.

Alternatively, the first person may run a search for second persons, and second person retrieved by this search may be displayed as candidates for a second person.

When the first person selects a second person, the authority giving unit 52 gives the selected second person an unlocking authority to unlock the space 2.

In particular, in the present exemplary embodiment, when the first person selects a second person by operating the user terminal 4, the authority giving unit 52 gives the selected second person an unlocking authority that enables the selected second person to unlock the space 2 within the time window of the reservation of the space 2 made by the first person.

In particular, the authority giving unit 52 gives the second person an unlocking authority that enables the second person to unlock the space 2 within the time window of the reservation of the space 2 but prohibits the second person from unlocking the space 2 in other time windows.

As with the first person, the second person who has been given the unlocking authority unlocks the space 2 by operating his or her user terminal 4.

As with the first person, when the time window of the reservation of the space 2 ends, the unlocking authority and the locking authority given to the second person become ineffective.

A timing of selection of a second person by the first person is not limited to a timing after the space 2 is reserved by the first person. The first person may select a second person at the same timing when the first person requests to reserve the space.

Figure 10:
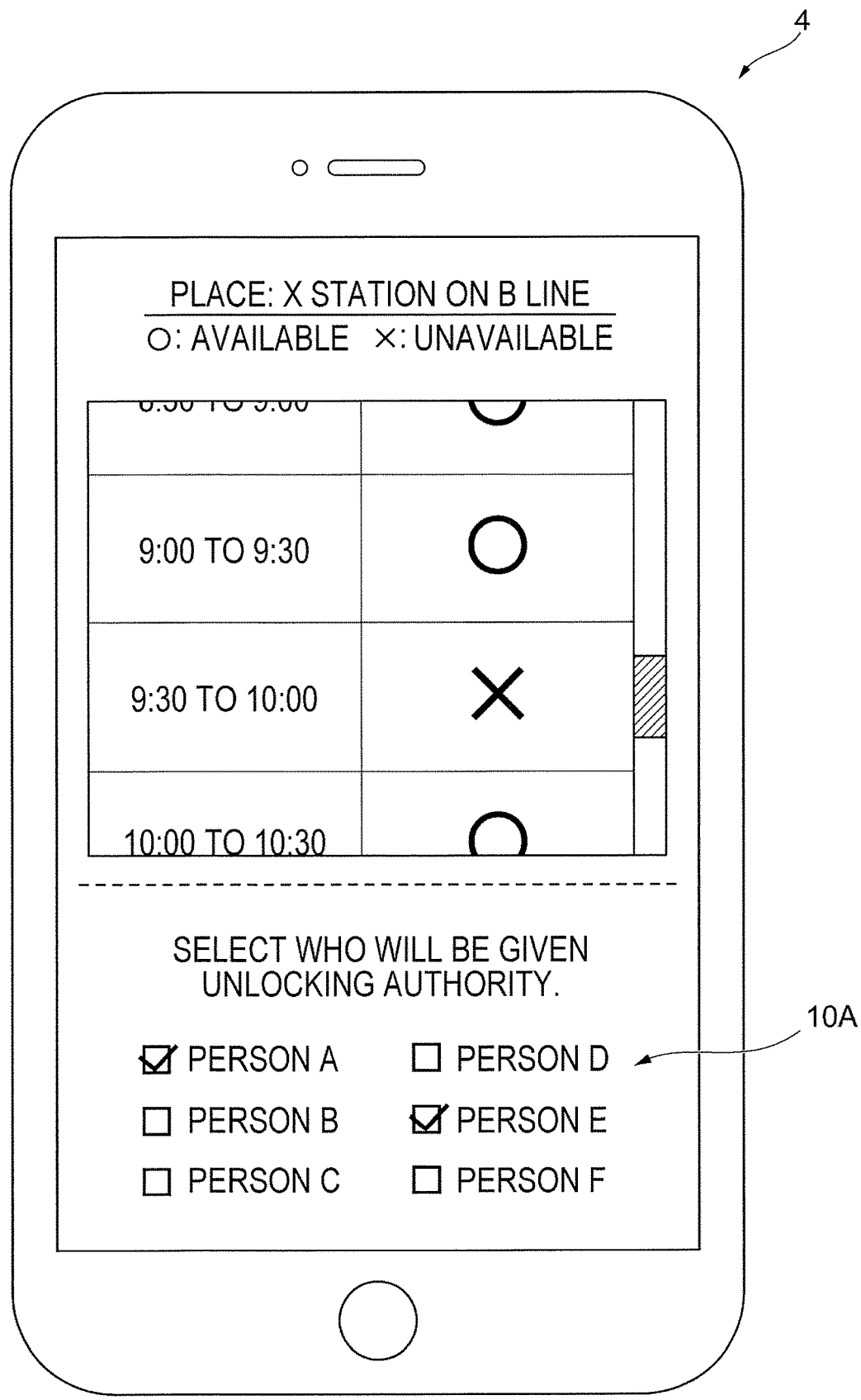
FIG. 10 illustrates another example of a screen displayed on a user terminal of a person who requests to reserve a space.

FIG. 10 illustrates another example of a screen displayed on the user terminal 4 of a first person when the first person requests to reserve a space 2.

Also on this screen, availability of the space 2 at a selected location is displayed in such manner that time windows for which the space 2 has already been reserved and time windows for which the space 2 is still available are distinguishable.

Furthermore, a list of second persons is displayed on this screen as indicated by reference sign 10A. In this case, the first person designates a time window for which the first person wants to reserve the space 2 and further selects a second person to be given an unlocking authority from the list of second persons as in the above case.

Figure 11:
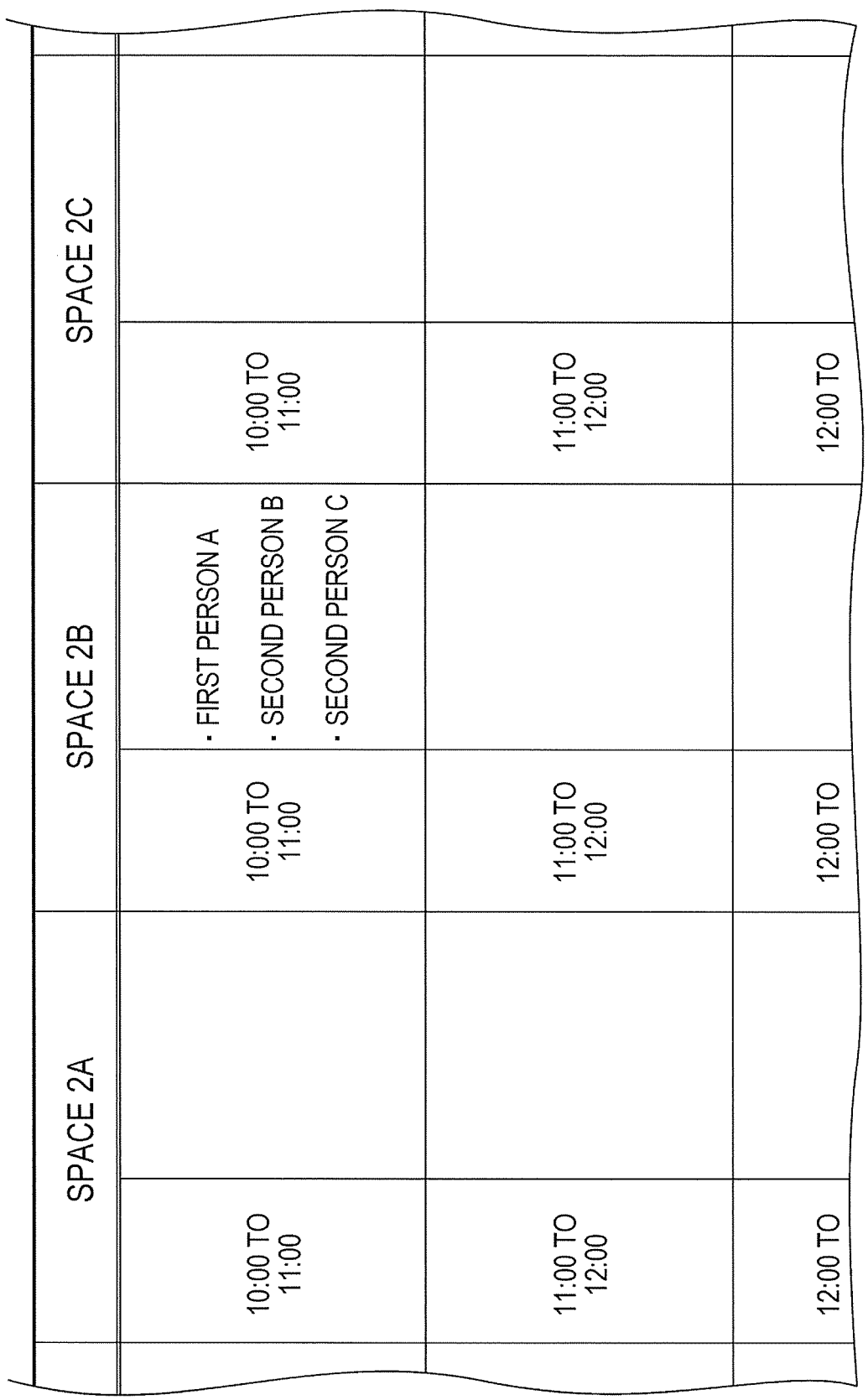
FIG. 11 illustrates an unlocking authority list stored in an information storage unit.

FIG. 11 illustrates an unlocking authority list stored in the information storage unit 57 of the space management server 5.

In the present exemplary embodiment, when a second person is given an unlocking authority, this second person is added to the unlocking authority list as illustrated in FIG. 11.

More specifically, in the unlocking authority list, a person who has been given an unlocking authority is registered in a field corresponding to a space 2 and a time window for which the unlocking authority has been given.

In this example, a first person in a time window 10:00 to 11:00 of a space 2B is a first person A, and the first person A has been given an unlocking authority.

Furthermore, in this example, a second person B and a second person C have been given an unlocking authority, and the second person B and the second person C are registered in the unlocking authority list.

Upon receipt of an instruction to unlock a space 2 from a user terminal 4, the unlocking controller 53 of the space management server 5 compares a person who gave the unlocking instruction with the persons registered in the unlocking authority list, and if the person who gave the unlocking instruction is registered in the unlocking authority list, unlocks the space 2.

More specifically, in the present exemplary embodiment, when a first person or a second person tries to unlock a space 2, the first person or the second person enters an ID and a password on his or her user terminal 4. Through this authentication process, the operator who is operating the user terminal 4 is identified.

Then, in the present exemplary embodiment, when an instruction to unlock the space 2 is received from the user terminal 4 on which the operator has been authenticated, it is determined whether or not the operator who gave the instruction to unlock the space 2 is registered in the unlocking authority list. In a case where the operator who gave the instruction to unlock the space 2 is registered in the unlocking authority list, the unlocking controller 53 unlocks the space 2.

There may be a situation where a first person suddenly becomes unable to use the space 2 which the first person has reserved or a situation where a first person and a second person use a space 2 together.

In such situations, in a case where a second person can also be given an unlocking authority as in the present exemplary embodiment, the second person can also use a space 2.

This allows the second person to use the space 2 instead of the first person and allows the first person and the second person to use the space 2 together.

A second person may be given an authority to lock a space 2 in addition to an unlocking authority to unlock the space 2. In this case, for example, information indicating that locking is also enabled is registered in the unlocking authority list in association with a registered second person.

A second person who has been given an authority to lock a space 2 in addition to an unlocking authority to unlock the space 2 becomes able to not only unlock the space 2 but also lock the space 2, for example, by operating his or her user terminal 4.

More specifically, upon receipt of a locking instruction from a second person, the unlocking controller 53, which also performs a locking operation, determines whether or not this second person is registered and whether or not information indicating that locking is also enabled is associated with this second person by referring to the unlocking authority list, and if this second person is registered and information indicating that locking is also enabled is associated with this second person, performs a locking operation.

It is desirable that the number of second persons to which the authority giving unit 52 may give an unlocking authority have a limit.

In this case, the authority giving unit 52 is configured to give an unlocking authority to up to a predetermined number of second persons. For example, the authority giving unit 52 gives an unlocking authority to up to three second persons.

For example, in a case where the authority giving unit 52 is configured to give an unlocking authority to up to a predetermined number of second persons, the number of second persons to which the authority giving unit 52 may give an unlocking authority may be the maximum number of persons that can be accommodated in a space 2 (a capacity of the space 2) reserved by a first person.

For example, in a case where a capacity of a space 2 reserved by a first person is three persons, the authority giving unit 52 may give an unlocking authority to up to three second persons.

Alternatively, for example, the number of second persons to which the authority giving unit 52 may give an unlocking authority may be a number obtained by subtracting the number of first persons from a capacity of a space 2 reserved by the first person.

For example, in a case where a single first person reserves a space 2 whose capacity is three persons, the authority giving unit 52 may give an unlocking authority to up to two second persons.

Figure 12:
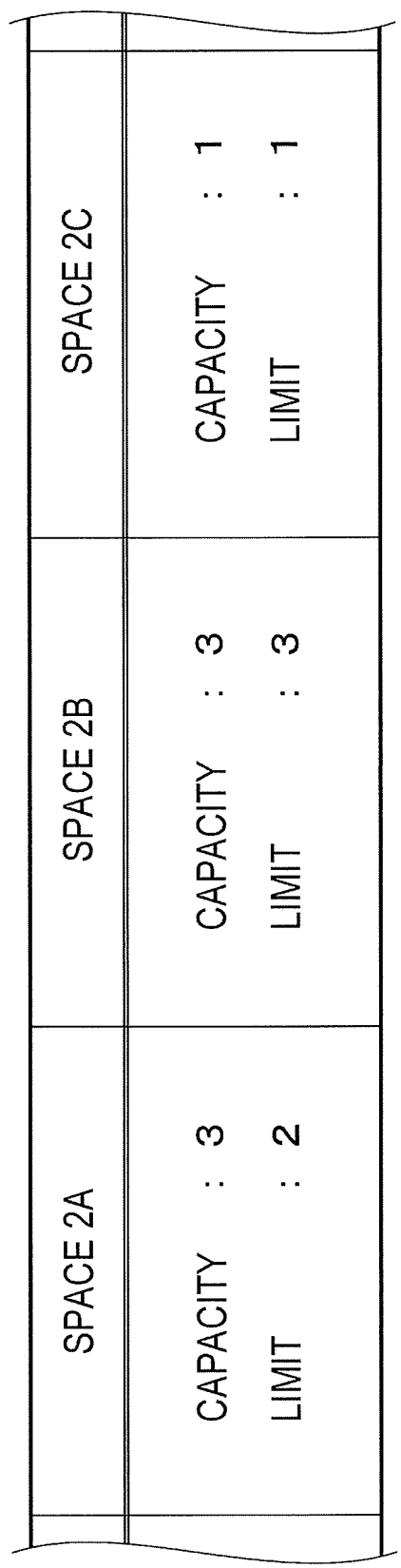
FIG. 12 illustrates a limit table.

In the present exemplary embodiment, a limit table illustrated in FIG. 12, which is a view illustrating a limit table, is stored in the information storage unit 57. In this limit table, each space 2 is associated with a capacity of the space 2 and a limit on the number of second persons who can be given an unlocking authority.

By referring to the limit table, the authority giving unit 52 grasps a limit on the number of second persons who can be given an unlocking authority to unlock a space 2 for which an unlocking authority is to be given to a second person.

For example, in a case where a first person gives an instruction to give an unlocking authority to a larger number of second persons than the limit, the authority giving unit 52 notifies the first person that the number of selected second persons exceeds the limit and gives an unlocking authority to as many second persons as the limit.

Alternatively, a first person may be notified of information on a limit in advance. Specifically, when a first person tries to reserve a space 2, information on a limit for this space 2 may be transmitted to the user terminal 4 of the first person.

Alternatively, information on a limit for a space 2 may be transmitted to the user terminal 4 of a first person who tries to reserve the space 2, and selection of a second person may be prohibited on the user terminal 4 when the limit is reached.

The limit on the number of second persons who can be given an unlocking authority may vary depending on a type of contract made by a first person. In other words, information on a limit stored in the limit table may vary depending on a type of contract made by a first person.

For example, in a case where a first person makes a first type of contract to use a space 2, a limit for this space 2 may be set to 1. Meanwhile, in a case where the first person makes a second type of contract that charges the first person a higher fee than the first type of contract, the limit may be more than 1.

Alternatively, a first person may be charged an additional fee or a second person may be charged a fee when the second person is given an unlocking authority.

A limit may be set on the number of unlocking authorities irrespective of the number of second persons.

In this case, for example, a limit for each space 2 is registered in the limit table, and the authority giving unit 52 gives an unlocking authority to a second person so that the number of unlocking authorities given to a second person(s) does not exceed the limit.

In this case, for example, as many unlocking authorities as the limit may be given to a single second person. Alternatively, a single unlocking authority may be given to each of plural second persons until a total number of unlocking authorities reaches the limit.

Alternatively, the authority giving unit 52 may give an unlocking authority to a second person that satisfies a predetermined condition.

Specifically, for example, the authority giving unit 52 may narrow second persons selected by a first person down to a second person that satisfies a predetermined condition and may give an unlocking authority to the second person that satisfies the predetermined condition.

In other words, for example, the authority giving unit 52 may decide a second person to be given an unlocking authority on the basis of information on second persons selected by a first person and give an unlocking authority to the decided second person.

More specifically, for example, the authority giving unit 52 may acquire positional information of second persons selected by a first person as information on the second persons and give an unlocking authority, for example, to a second person located within a predetermined distance from a space 2 reserved by the first person.

For example, assume that a first person suddenly becomes unable to use a space 2 and gives an unlocking authority to another person. In this case, for example, the first person selects a second person to be given an unlocking authority from among plural persons displayed on the user terminal 4.

In this case, the selected second person may be a second person located far away from the space 2 or a second person who cannot use the space 2.

In this case, in a case where a second person to be given an unlocking authority is decided on the basis of positional information of the second persons as described above, an unlocking authority is given to a second person located close to the space 2.

The positional information of the second persons can be acquired as follows. Specifically, information obtained from the GPS sensors 206 provided in the user terminals 4 of the second persons is acquired from the user terminals 4.

Although a case where a second person to be given an unlocking authority is decided on the basis of positional information of second persons has been described above, a second person to be given an unlocking authority may be decided on the basis of any of other kinds of information concerning second persons.

For example, a second person to be given an unlocking authority may be decided on the basis of information such as genders, ages, or past records of use of the second persons.

In the present exemplary embodiment, the spaces 2 may be used for delivery of products. For example, a deliverer places a product in a space 2, and a first person who visits this space 2 later receives the product. In this case, this deliverer is decided as a second person and given an unlocking authority. This allows the deliverer to place a product in the space 2.

In this case, in a case where a locking authority is also given to the deliverer in addition to the unlocking authority, the deliverer can lock the space 2 after placing a product in the space 2.

Although a case where a second person is a person who has been registered as a user has been described above, an unlocking authority and a locking authority may also be given to a second person who has not been registered as a user.

For example, some second persons (e.g., a deliverer) just need to be temporarily permitted to unlock and lock a space 2 only one time. In this case, in a case where such a second person can unlock and lock a space 2 without being registered as a user, convenience of users of the spaces 2 improves.

In a case where an unlocking authority or a locking authority is given to a person who has not been registered as a user, for example, a first person requests the space management server 5 to issue identification information by operating his or her user terminal 4.

The space management server 5 issues identification information and transmits the identification information to the user terminal 4 of the first person. This identification information is stored in the information storage unit 57 in association with a space 2 reserved by the first person.

Next, the first person transmits the acquired identification information to a terminal device of the second person who has not been registered as a user. When the second person who has not been registered as a user unlocks or locks the space 2, this second person transmits the identification information to the space management server 5 by operating the terminal device.

The space management server 5 compares the transmitted identification information with identification information (identification information associated with the space 2) stored in the information storage unit 57, and in a case where the transmitted identification information matches the identification information stored in the information storage unit 57, unlocks or locks the space 2.

Furthermore, an unlocking authority given to a second person by the authority giving unit 52 may have a limit on the number of times of unlocking. More specifically, an unlocking authority given to a second person by the authority giving unit 52 may enable the second user to unlock a space 2 only one time.

Some second persons (e.g., a deliverer) need to unlock a space 2 only one time. By giving the deliverer an unlocking authority that enables unlocking of the space 2 only one time, it is possible to prevent the deliverer from unlocking the space 2 again after the space 2 is unlocked.

Alternatively, an unlocking authority given to a second person by the authority giving unit 52 may enable the second person to unlock a space 2 plural times.

In a case where an unlocking authority given to a second person has a limit on the number of times of unlocking, information on the number of times of unlocking (a limit on the number of times of unlocking) is registered in advance in association with each second person registered in the unlocking authority list.

The number of times of unlocking is designated, for example, by a first person. The first person designates the number of times of unlocking by operating the user terminal 4. Then, information on the number of times of unlocking is transmitted to the space management server 5 and is registered in association with a second person.

In this case, in the present exemplary embodiment, the number of times of unlocking of a second person is incremented by 1 every time the unlocking controller 53 unlocks a space 2 based on an instruction from the second person.

After the number of times of unlocking reaches a limit on the number of times of unlocking, the unlocking controller 53 does not perform unlocking based on an instruction from the second person.

Figure 13:
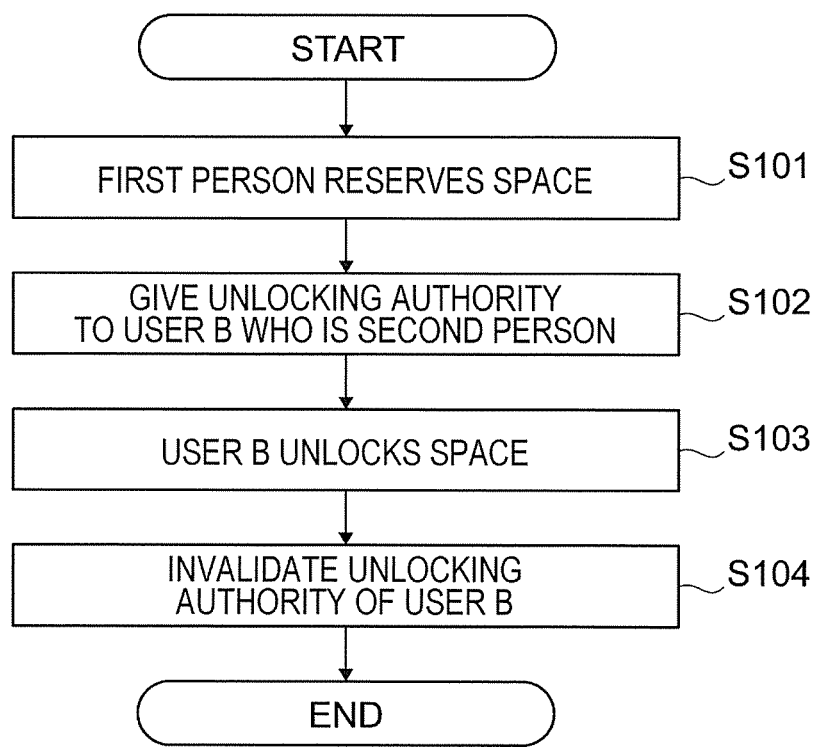
FIG. 13 is a flowchart illustrating an example of flow of processing executed when an unlocking authority is given to a person different from a person who reserves a space.

FIG. 13 is a flowchart illustrating an example of flow of processing performed when an unlocking authority is given to a second person.

In this example, first, a first person reserves a space 2 by operating his or her user terminal 4 (step S101). In this way, the first person gets an unlocking authority to unlock the space 2 within a time window.

Furthermore, in this processing example, it is assumed that a user B, who is a second person, visits the space 2. In this case, the first person gives an unlocking authority to the user B by operating the user terminal 4 (step S102).

Then, in this processing example, the user B arrives at the space 2 and unlocks the space 2 by operating his or her user terminal 4 (step S103).

Then, in the present exemplary embodiment, the unlocking authority of the user B is invalidated (step S104).

More specifically, in this processing example, it is assumed that the unlocking authority given to the user B is an unlocking authority that enables unlocking only one time. When the user B unlocks the space 2, the number of times of unlocking of the user B reaches a limit. Thereafter, the user B cannot unlock the space 2.

Next, control of an apparatus placed in a space 2 is described.

An apparatus placed in each space 2 may be controlled in a way that varies depending on a person who uses the space 2. Specifically, an apparatus placed in a space 2 may be controlled in a way that varies depending on whether a person who uses the space 2 is a first person or a second person.

In the present exemplary embodiment, the apparatus controller 54 controls an apparatus placed in a space 2. The apparatus controller 54 may control the apparatus differently depending on whether the space 2 is used by a first person or a second person.

For example, the apparatus controller 54 according to the present exemplary embodiment controls a lighting differently depending on whether the space 2 is used by a first person or a second person.

More specifically, for example, the apparatus controller 54 controls the lighting so as to increase a light amount of the lighting in a case where the space 2 is used by the first person and controls the lighting so as to decrease a light amount of the lighting in a case where the space 2 is used by the second person.

For example, in a case where the second person is a deliverer or the like, who just places a product in the space 2, as described above, lowering illuminance of the space 2 hardly affects the second person. In view of this, the apparatus controller 54 may control the lighting so as to decrease a light amount of the lighting in a case where the space 2 is used by the second person as described above.

Alternatively, for example, the apparatus controller 54 may control an air-conditioning apparatus so that a temperature in the space 2 falls within a predetermined range in a case where the space 2 is used by the first person and control the air-conditioning apparatus to turn off in a case where the space 2 is used by the second person.

The apparatus controller 54 may control an apparatus placed in a space 2 in a same way irrespective of who a second person who uses the space 2 is. Alternatively, the apparatus controller 54 may control the apparatus differently among second persons depending on information on the second persons such as attribute information of the second persons.

Furthermore, a way in which an apparatus placed in a space 2 is controlled in a case where the space 2 is used by a second person may be decided on the basis of an instruction from a first person. In this case, the apparatus controller 54 decides a way to control the apparatus in a case where the space 2 is used by a second person on the basis of an instruction from the first person and controls the apparatus in the decided way.

Alternatively, the apparatus controller 54 may control to prevent one or more apparatuses placed in a space 2 from being used by a second person.

More specifically, in a case where a space 2 is used by a second person, the apparatus controller 54 may prevent one or more apparatuses placed in the space 2 from being used by the second person, for example, by controlling power supply to the one or more apparatuses placed in the space 2.

Specifically, for example, the apparatus controller 54 may prevent a display device placed in a space 2 from being used by a second person by stopping power supply to the display device.

Furthermore, the apparatus controller 54 may prevent all apparatuses placed in a space 2 from being used by a second user by stopping power supply to all of the apparatuses.

In a case where the apparatus controller 54 prevent one or some apparatuses from being used, the apparatus controller 54 may decide the one or some apparatuses on the basis of an instruction from a first person as in the above case.

Specifically, for example, upon receipt of an instruction from a first person to prevent a display device from being used by a second person, the apparatus controller 54 prevents the display device from being used by the second person by changing settings so that power supply to the display device is stopped.

In a case where an apparatus placed in a space 2 is controlled in a way that varies depending on whether a person who uses the space 2 is a first person or a second person as described above, it is necessary to grasp whether the person who uses the space 2 is a first person or a second person.

For example, information on a person who has given an instruction to unlock a space 2 is acquired, and whether or not a person who uses the space 2 is a first person or a second person is grasped on the basis of this information.

Next, deprivation of an unlocking authority is described.

In the present exemplary embodiment, the authority depriving unit 55 that deprives a person of an unlocking authority is provided.

The authority depriving unit 55 deprives a first person of an unlocking authority and deprives a second person of an unlocking authority, for example, in a case where a reservation of a space 2 made by the first person is cancelled.

More specifically, the authority depriving unit 55 deprives a first person of an unlocking authority and deprives a second person of an unlocking authority, for example, in a case where a reservation of a space 2 made by the first person is cancelled by the first person before the start of a time window of the reservation of the space 2.

This can avoid a situation where a space 2 is still available to a first person and a second person even if a reservation of the space 2 has been cancelled.

More specifically, the authority depriving unit 55 deprives a first person of an unlocking authority and deprives a second person of an unlocking authority by deleting information on the first person and the second person from the unlocking authority list.

Alternatively, for example, the authority depriving unit 55 may deprive a second person of an unlocking authority upon receipt of an instruction from a first person.

In this case, the authority depriving unit 55 may deprive all second persons of unlocking authorities or may deprive one or some of the second persons, for example, a second person selected by the first person of an unlocking authority.

Alternatively, the authority depriving unit 55 may deprive a first person of an unlocking authority and deprive a second person of an unlocking authority, for example, in a case where the first person stops use of a space 2 within a time window for which the first person reserved the space 2.

Also in this case, the authority depriving unit 55 may deprive all second persons of unlocking authorities or may deprive one or some of the second persons of an unlocking authority.

In a case where the authority depriving unit 55 deprives one or some of the second persons of an unlocking authority, the other second person(s) can continue use of the space 2.

Next, deprivation of an unlocking authority given to a first person is further described.

The authority depriving unit 55 may deprive a first person of an unlocking authority in a case where an unlocking authority is given to a second person by the authority giving unit 52.

Also in this case, the first person is deprived of the unlocking authority by deleting information on the first person from the unlocking authority list.

More specifically, for example, the authority depriving unit 55 may deprive a first person of an unlocking authority in a case where an unlocking authority is given to a second person and the number of second persons who have been given an unlocking authority reaches a predetermined number.

More specifically, for example, the authority depriving unit 55 may deprive a first person of an unlocking authority in a case where the number of second persons who have been given an unlocking authority reaches a capacity of a space 2 reserved by the first person.

More specifically, for example, the authority depriving unit 55 may deprive a first person of an unlocking authority in a case where a capacity of a space 2 reserved by the first person is 3 persons and an unlocking authority has been given to three second persons.

When the number of second persons who have been given an unlocking authority becomes large, the number of persons actually using a space 2 reserved by a first person becomes large. This may make it hard to use the space 2.

Furthermore, the first person, who has given an unlocking authority to a second person, may have no intention to use the space 2.

In view of this, not only a second person, but also the first person may be deprived of an unlocking authority.

Even if a first person is deprived of an unlocking authority once, an unlocking authority may be given to this first person again.

Specifically, for example, in a case where a second person who has been given an unlocking authority finishes use of a space 2 before the end of a time window of a reservation of the space 2, an unlocking authority may be given again to a first person who has been deprived of an unlocking authority.

In other words, for example, in a case where an unlocking authority has been given to as many second persons as can be accommodated in a space 2 and where one or more of the second persons finishes use of the space 2 before the end of a time window of a reservation of the space 2, an unlocking authority may be given again to a first person who has no unlocking authority.

Note that whether or not a second person has finished use of a space 2 before the end of a time window of a reservation of the space 2 is determined, for example, on the basis of information supplied from the information acquisition device 29 (see FIG. 2) placed in the space 2.

In a case where a second person who finishes use of a space 2 before the end of a time window of a reservation of the space 2 holds his or her ID card or the like over the information acquisition device 29 (e.g., a card reader) before leaving the space 2, information is acquired from the information acquisition device 29, and whether or not the second person has finished use of the space 2 before the end of the time window is determined on the basis of this information.

Alternatively, for example, a second person may enter information indicating that the second person has finished use of a space 2 on his or her user terminal 4, and whether or not the second person has finished use of the space 2 before the end of a time window of a reservation of the space 2 may be determined on the basis of this information supplied from the user terminal 4.

Furthermore, for example, every time a space 2 reserved for a time window by a first person is unlocked within the time window, an unlocking authority to unlock the space 2 may be given to a person different from a person who has unlocked the space 2.

In the present exemplary embodiment, the sequentially-authorizing unit 56 is provided.

The sequentially-authorizing unit 56 causes a person different from a person who has unlocked a space 2 reserved for a time window by a first person to be newly registered in the unlocking authority list every time the space 2 is unlocked within the time window. In this way, the person different from the person who has unlocked the space 2 is newly given an unlocking authority to unlock the space 2.

Note that whether or not a space 2 has been unlocked within a time window of a reservation of the space 2 is determined, for example, on the basis of whether or not the unlocking controller 53 has performed unlocking within the time window.

Furthermore, in this case, a person who has unlocked the space 2 may be deprived of an unlocking authority every time the space 2 is unlocked within the time window.

More specifically, in this case, the authority depriving unit 55 deprives a person who has unlocked the space 2 of an unlocking authority by deleting information on this person from the unlocking authority list every time the space 2 is unlocked within a time window of a reservation of the space 2.

In a case where a new unlocking authority is given and a person who has unlocked a space 2 is deprived of an unlocking authority every time the space 2 is unlocked within a time window of a reservation of the space 2 as described above, an unlocking authority to unlock the space 2 sequentially transfers to another person every time the space 2 is unlocked.

In particular, in a case where this processing is performed, when a second person who has been given an unlocking authority by the authority giving unit 52 unlocks a space 2 within a time window of a reservation of the space 2, this unlocking authority substantially transfers to another person.

Note that the other person to whom the unlocking authority transfers may be a first person or may be a second person.

In the present exemplary embodiment, the setting unit 58 is provided. In the present exemplary embodiment, the setting unit 58 may set a person to be given an unlocking authority by the sequentially-authorizing unit 56.

More specifically, for example, the setting unit 58 receives information from a first person and sets a person to be given an unlocking authority by the sequentially-authorizing unit 56 on the basis of this information.

In a case where a single person is to be given an unlocking authority by the sequentially-authorizing unit 56, the setting unit 58 sets this single person to be given an unlocking authority.

Meanwhile, in a case where plural persons are to be given an unlocking authority by the sequentially-authorizing unit 56, the setting unit 58 sets the plural persons and an order in which an unlocking authority is given to the plural persons.

The order may be automatically set in accordance with a predetermined condition or may be set on the basis of an instruction concerning the order from a first person.

The sequentially-authorizing unit 56 gives an unlocking authority to a new person by referring to the settings made by the setting unit 58.

In a case where plural persons are to be given an unlocking authority, the sequentially-authorizing unit 56 sequentially gives an unlocking authority to the plural persons in an order set by the setting unit 58.

Figure 14:
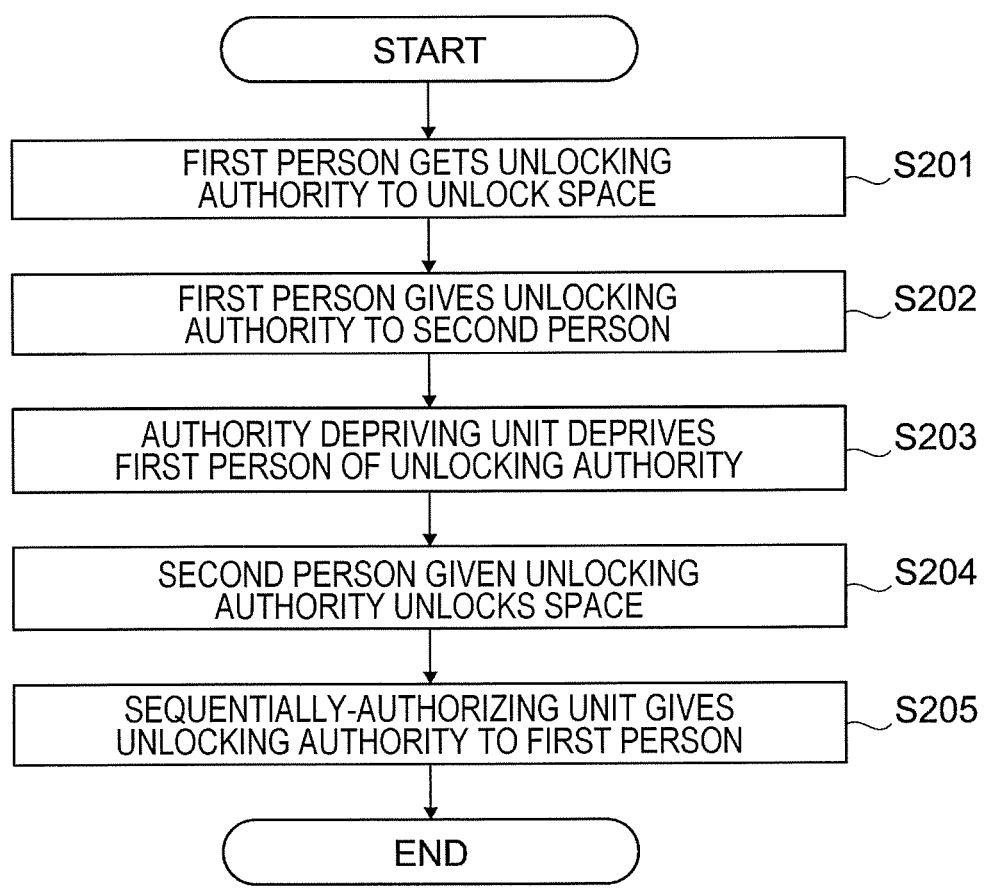
FIG. 14 is a flowchart illustrating an example of flow of processing performed in a case where an unlocking authority is sequentially given by a sequentially-authorizing unit.

FIG. 14 is a flowchart illustrating an example of flow of processing performed in a case where an unlocking authority is sequentially given by the sequentially-authorizing unit 56.

Also in this example, first, a first person reserves a space 2 and gets an unlocking authority to unlock the space 2 (step S201).

Next, in this processing example, the first person gives an unlocking authority to a second person (step S202).

Then, in this processing example, the authority depriving unit 55 deprives the first person of the unlocking authority (step S203).

In this processing example, the authority depriving unit 55 is configured to deprive the first person of the unlocking authority when the number of second persons who have been given an unlocking authority becomes 1, which is a limit. Accordingly, when the first person gives an unlocking authority to a second person, the first person is deprived of the unlocking authority.

In particular, in this processing example, the limit on the number of unlocking authorities is set to 1, and therefore when the first person gives an unlocking authority to a single second person, the first person is deprived of the unlocking authority.

Next, in this processing example, the second person who has been given the unlocking authority unlocks the space 2 (step S204).

When the second person unlocks the space 2, the sequentially-authorizing unit 56 gives an unlocking authority to the first person (step S205).

In other words, in this processing example, the first person is set as a person to whom an unlocking authority is to be given next (to whom the unlocking authority transfers). Accordingly, when the second person unlocks the space 2, the sequentially-authorizing unit 56 gives an unlocking authority to the first person. That is, the unlocking authority returns to the first person.

Although a case where the unlocking authority transfers to the first person when the second person unlocks the space 2 has been described in this processing example, a second person may be set as a person to whom an unlocking authority is to be given next (to whom the unlocking authority transfers). In this case, the unlocking authority transfers to this second person.

Although a case where the sequentially-authorizing unit 56 gives an unlocking authority to a person different from a person who has unlocked the space 2 when the space 2 is unlocked has been described above, the sequentially-authorizing unit 56 may give an unlocking authority to a person different from a person who has unlocked the space 2 when this person who has unlocked the space 2 exits the space 2.

Whether or not a first person or a second person has exited the space 2 can be determined, for example, on the basis of whether or not an ID card or the like of a user of the space 2 has been held over the information acquisition device 29 (e.g., a card reader).

Alternatively, a user may enter information indicating that the user has finished use of a space 2 on his or her user terminal 4, and whether or not the user has exited the space 2 may be determined on the basis of this information supplied from the user terminal 4.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
    a receiving unit that receives a reservation request to reserve a lockable place for a time window from a first person; and
    a processor, executing instructions loaded from a memory and configured to function as an authority giving unit and a depriving unit,
    wherein the authority giving unit that gives one or more second persons an unlocking authority to unlock the place within the time window; and
    the depriving unit that deprives the one or more second persons of the unlocking authority after the unlocking authority has been given to the one or more second persons by deleting information corresponding to the deprived one or more second persons from an unlocking authority list,
    wherein depriving unit deprives the first person and the one or more second persons of the unlocking authority when the first person stops use of the place within a time window for which the first person reserves the place,
    wherein, when the depriving unit deprives one of the first person and the second persons of the unlocking authority, the unlocking authority is transferred to another one of the first person and the second persons,
    wherein, when the one of the second persons who has been given the unlocking authority unlocks the place, the unlocking authority is transferred to another one of the first person and the second persons.

2. The information processing system according to claim 1, wherein
    the number of second persons to which the authority giving unit may give the unlocking authority has a limit.

3. The information processing system according to claim 2, wherein
    the number of second persons to which the authority giving unit may give the unlocking authority is a maximum number of persons accommodated in the place.

4. The information processing system according to claim 1, further comprising a controller that controls an apparatus provided in the place differently depending on whether the place is used by the first person or the one or more second persons.

5. The information processing system according to claim 1, further comprising a controller that controls to prevent one or more apparatuses provided in the place from being used by the one or more second persons.

6. The information processing system according to claim 1, wherein
    the one or more second persons to which the unlocking authority is given by the authority giving unit satisfy a predetermined condition.

7. The information processing system according to claim 1, wherein
    the unlocking authority given to the one or more second persons has a limit on the number of times of unlocking of the place.

8. The information processing system according to claim 1, wherein
    the authority giving unit gives the one or more second persons an authority to lock the place in addition to the unlocking authority.

9. The information processing system according to claim 1, wherein
    the depriving unit deprives the one or more second persons of the unlocking authority in response to cancellation of the reservation.

10. The information processing system according to claim 1, wherein the depriving unit deprives the first person of an unlocking authority to unlock the place within the time window when the unlocking authority is given to a second person by the authority giving unit.

11. The information processing system according to claim 10, wherein
    the depriving unit deprives the first person of the unlocking authority when the number of second persons to which the authority giving unit has given the unlocking authority reaches a predetermined number.

12. The information processing system according to claim 1, further comprising a sequentially-authorizing unit that, when the place is unlocked by a person within the time window, gives an unlocking authority to unlock the place to a person different from the person who has unlocked the place.

13. The information processing system according to claim 12, wherein
the person who has unlocked the place becomes no longer authorized to unlock the place after the unlocking of the place.

14. The information processing system according to claim 12, further comprising a setting unit that sets a person to be given the unlocking authority by the sequentially-authorizing unit.

15. An information processing apparatus comprising:
a receiving unit that receives a reservation request to reserve a lockable place for a time window from a first person; and
a processor, executing instructions loaded from a memory and configured to function as an authority giving unit and a depriving unit,
wherein the authority giving unit that gives one or more second persons an unlocking authority to unlock the place within the time window; and
the depriving unit that deprives the one or more second persons of the unlocking authority after the unlocking authority has been given to the one or more second persons by deleting information corresponding to the deprived one or more second persons from an unlocking authority list,
wherein depriving unit deprives the first person and the one or more second persons of the unlocking authority when the first person stops use of the place within a time window for which the first person reserves the place,
wherein, when the depriving unit deprives one of the first person and the second persons of the unlocking authority, the unlocking authority is transferred to another one of the first person and the second persons,
wherein, when the one of the second persons who has been given the unlocking authority unlocks the place, the unlocking authority is transferred to another one of the first person and the second persons.

16. A non-transitory computer readable medium storing a program causing a computer to execute a process for information processing, the process comprising:
receiving a reservation request to reserve a lockable place for a time window from a first person;
giving one or more second persons an unlocking authority to unlock the place within the time window; and
depriving the one or more second persons of the unlocking authority after the unlocking authority has been given to the one or more second persons by deleting information corresponding to the deprived one or more second persons from an unlocking authority list,
wherein the first person and the one or more second persons of the unlocking authority are deprived when the first person stops use of the place within a time window for which the first person reserves the place,
wherein, when one of the first person and the second persons of the unlocking authority is deprived, the unlocking authority is transferred to another one of the first person and the second persons,
wherein, when the one of the second persons who has been given the unlocking authority unlocks the place, the unlocking authority is transferred to another one of the first person and the second persons.

* * * * *